(No Model.)
F. DICKERT.
APPARATUS FOR REFINING SULPHUR.
No. 310,187. Patented Jan. 6, 1885.
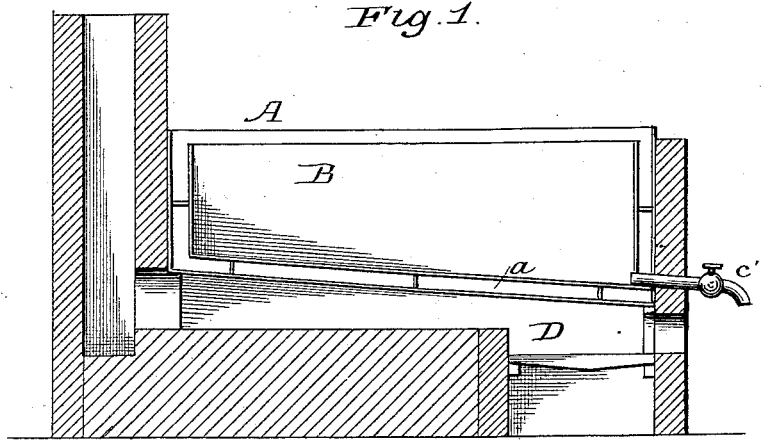
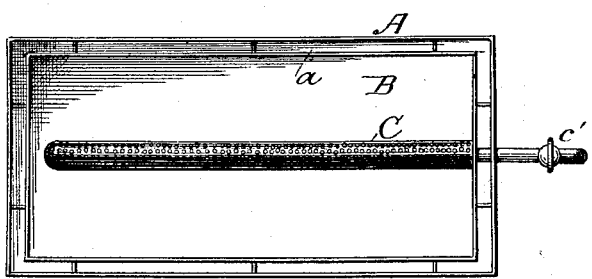
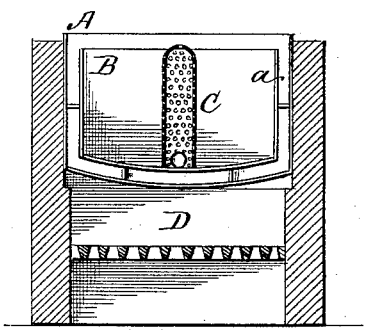
Witnesses:
L. C. Hills
W. B. Masson
Inventor:
Ferdinand Dickert
by E. E. Masson
atty.

UNITED STATES PATENT OFFICE.

FERDINAND DICKERT, OF SALT LAKE CITY, UTAH TERRITORY.

APPARATUS FOR REFINING SULPHUR.

SPECIFICATION forming part of Letters Patent No. 310,187, dated January 6, 1885.

Application filed March 29, 1884. (No model.)

*To all whom it may concern:*

Be it known that I, FERDINAND DICKERT, a citizen of the United States, residing at Salt Lake City, in the county of Salt Lake and Territory of Utah, have invented certain new and useful Improvements in Sulphur-Refining Apparatus; of which the following is a specification, reference being had therein to the accompanying drawings, in which—

Figure 1 is a vertical section, Fig. 2 a plan view, and Fig. 3 a transverse section, of an apparatus constructed in accordance with my invention, for the purpose of purifying sulphur-ore or melting the sulphur thereof.

Like letters refer to like parts in all the figures.

A represents a sheet-iron box or vat, provided with a lining, B, arranged therein so as to form spaces $a$ between them. The lining may be made of lead or wood or other suitable substance, which, after becoming worn or otherwise injured by contact with the sulphur, may be removed and a new lining substituted therefor. In this manner I am enabled to use the sheet-iron vat longer than if the sulphur was allowed to come in contact therewith.

C is a discharge-passage arranged centrally within the lined vat and separating in two parts the body of the ore contained within the vat. This passage is formed by a perforated or reticulated covering, $c$, which may be extended upwardly more or less, as shown in Fig. 3.

A suitable stop-cock, $c'$, may be applied to the discharge-passage in order to control the flow of refined sulphur therefrom. This vat is arranged in an inclined manner, as clearly shown in Fig. 1, within and over any suitable fire-place or grate, D.

In using the apparatus above described the object is to bring the sulphur in the ore into a melted condition by using as a heat-transmitting medium a heated solution of chloride of calcium. The latter will not boil at a lower temperature than 120° centigrade, while the sulphur will melt at 111° centigrade, and will pass throughout the interstices or perforations of the covering $c$ and become separated from the remaining ore in the vat.

I do not confine myself to the exact details of construction herein shown, but believe that I am the first to provide a sulphur-vat with a discharge-passage having a recticulated or perforated covering, and I deem such construction as the important feature of my invention, and any modification of a reticulated passage which would suggest itself to persons skilled in the construction of similar apparatuses I deem as apprehended by my invention.

Having described my invention and its operation, what I claim, and desire to secure by Letters Patent, is—

1. A vat for purifying sulphur, provided with a longitudinal discharge-passage separated from the main body of the vat by a reticulated or apertured cover extending the length thereof, in combination with a furnace under said vat, substantially as shown and described.

2. In a sulphur-refining apparatus, the combination of the vat A, lining B, discharge-passage C, and longitudinal reticulated cover $c$, and a furnace under said vat, substantially as shown and described.

In testimony whereof I affix my signature in presence of two witnesses.

FERDINAND DICKERT.

Witnesses:
OTTO E. SALOMON,
JOHN A. MITCHELL.